US010123228B2

(12) United States Patent
Moisio et al.

(10) Patent No.: US 10,123,228 B2
(45) Date of Patent: Nov. 6, 2018

(54) SIGNALING SUPPORT FOR DEVICES WITH MULTIPLE AND/OR FLEXIBLE FORM FACTORS (71) Applicant: NOKIA CORPORATION, Espoo (FI)

(72) Inventors: Martti Moisio, Vantaa (FI); Osman Yilmaz, Helsinki (FI); Mikko A. Uusitalo, Helsinki (FI); Cassio Ribeiro, Espoo (FI); Carl Wijting, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 675 days.

(21) Appl. No.: 13/968,015

(22) Filed: Aug. 15, 2013

(65) Prior Publication Data

US 2015/0050927 A1 Feb. 19, 2015

(51) Int. Cl.
*H04W 24/10* (2009.01)
*H04W 8/22* (2009.01)

(52) U.S. Cl.
CPC ............. *H04W 24/10* (2013.01); *H04W 8/22* (2013.01)

(58) Field of Classification Search
CPC .................................................... H04W 24/01
See application file for complete search history.

(56) References Cited

U.S. PATENT DOCUMENTS

| 2013/0051288 A1* | 2/2013 | Yamada | ................... | H04W 8/24 370/280 |
| 2014/0078973 A1* | 3/2014 | Kazmi | ................... | H04W 8/22 370/329 |

FOREIGN PATENT DOCUMENTS

| WO | 2013/022310 A2 | 2/2013 |
| WO | 2013/051993 A1 | 4/2013 |
| WO | 2013/063793 A1 | 5/2013 |

OTHER PUBLICATIONS

"Proposed Modifications to LTE feature group indications", Nokia Siemens Networks, Nokia Corporation, 3GPP TSG-RAN Plenary Meeting #44, Aruba, Netherland.*
"Ahead of the curve: Samsung, LG and the bendable phone," CNet, Ben Fox Rubin, Dec. 29, 2014, available at https://www.cnet.com/news/ahead-of-the-curve-samsung-lg-and-the-bendable-phone/.*
3GPP TS 36.331 V11.4.0 (Jun. 2013).*
Machine translation of Chinese office action from Feb. 4, 2017.*
European Search Report application No. 14180006.0 dated Jan. 23, 2015.

* cited by examiner

*Primary Examiner* — Kamran Afshar
*Assistant Examiner* — David Orange
(74) *Attorney, Agent, or Firm* — Squire Patton Boggs (US) LLP (57) ABSTRACT

Systems, methods, apparatuses, and computer program products for signaling support for devices with multiple and/or flexible form factors are provided. One method includes determining, by a device having multiple forms and associated with a network, a current form or a change in the form of the device, determining new parameters according to the determined current form of the device, and reporting the new parameters to the network.

18 Claims, 4 Drawing Sheets

SIGNALING SUPPORT FOR DEVICES WITH MULTIPLE AND/OR FLEXIBLE FORM FACTORS

BACKGROUND

Field

Embodiments of the invention generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), and/or LTE-Advanced (LTE-A). Some embodiments may specifically relate to support for multi-form and/or flexible devices in such communications networks.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN) no RNC exists and most of the RNC functionalities are contained in the eNodeB (enhanced Node B).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE is also expected to improve spectral efficiency in 3G networks, allowing carriers to provide more data and voice services over a given bandwidth. Therefore, LTE is designed to fulfill future needs for high-speed data and media transport in addition to high-capacity voice support. Advantages of LTE are, for example, high throughput, low latency, FDD and TDD support in the same platform, an improved end-user experience, and a simple architecture resulting in low operating costs.

Further releases of 3GPP LTE (e.g., LTE Rel-10, LTE Rel-11, LTE Rel-12) are targeted towards future international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A can be considered a more optimized radio system fulfilling the international telecommunication union-radio (ITU-R) requirements for IMT-Advanced while keeping the backward compatibility.

SUMMARY

One embodiment is directed to a method including determining, by a device having multiple forms and associated with a network, a current form or a change in the form of the device, determining new parameters according to the determined current form of the device, and reporting the new parameters to the network.

Another embodiment is directed to an apparatus. The apparatus includes at least one processor and at least one memory comprising computer program code. The apparatus may include a device having multiple forms and associated with a network. The at least one memory and the computer program code are configured, with the at least one processor, to cause the apparatus at least to determine a current form or a change in the form of the apparatus, determine new parameters according to the determined current form of the apparatus, and report the new parameters to the network.

Another embodiment is directed to a computer program, embodied on a computer readable medium, wherein the computer program is configured to control a processor to perform a process. The process includes determining, by a device having multiple forms and associated with a network, a current form or a change in the form of the device, determining new parameters according to the determined current form of the device, and reporting the new parameters to the network.

Another embodiment is directed to a method including receiving, by a network element, new parameters from a device having multiple forms. The method may then include updating radio configurations for the device having multiple forms, based on the new parameters.

Another embodiment is directed to an apparatus. The apparatus includes at least one processor and at least one memory comprising computer program code. The at least one memory and the computer program code are configured, with the at least one processor, to cause the apparatus at least to receive new parameters from a device having multiple forms, and to update radio configurations for the device having multiple forms, based on the new parameters.

Another embodiment is directed to a computer program, embodied on a computer readable medium, wherein the computer program is configured to control a processor to perform a process. The process includes receiving, by a network element, new parameters from a device having multiple forms. The process may then include updating radio configurations for the device having multiple forms, based on the new parameters.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for signaling support for devices with multiple and/or flexible form factors, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

There has been great progress lately in the area of stretchable electronics, nanomaterials, flexible displays, devices with new form factors, etc. These new types of devices can present new challenges to radio system operation, since the physical form factor of the device can change in a way that may greatly affect the radio operation. This may occur, for example, as a result of the change in the relative position of antenna elements, or even in the number of active antenna properties. There can be also effects related to changes of electromagnetic properties and coupling effects of the whole device.

A current approach in the multi-form device design is that the radio operation should be totally agnostic to the form factor. For example, there are wireless laptops which can be turned into wireless tablets by removing the magnetically attached keyboard and vice versa. In this example, the radio part is functionally independent from the part that has the display (the tablet part). However, with truly flexible devices, there is not such a clear independence. In addition, the new features described herein for flexible or multiple form factor devices may also be utilized with or applicable to devices with more conventional forms.

As suggested above, new device form factors, such as those with flexible, foldable, expandable displays, etc. and extendable devices (e.g., tablet as a docking station) can introduce challenges to the radio operation. It is no longer straightforward to assume that the radio frequency (RF) part of the device can function completely separated from the rest of the device itself. However, in cellular systems such as LTE, device capabilities must be reported to the network and, currently, the only solution is to report the capabilities that are supported by all the form factors. In some cases, this may mean that the full device capabilities cannot be used because the network assumes that the UE is capable of only supporting the least capable subset of the modes. Currently, in the 3GPP specifications (TS 36.331 and TS 23.401), there is no support for UE capability update for LTE, except via UE detach and re-attach.

According to one embodiment, a device, such as a flexible and/or multi-form device, informs the network about its capability for operating with more than one physical form factor, each having an effect on its radio performance. Additionally or alternatively, in an embodiment, the information about form factor changes and/or device capabilities may be sent by the device upon changes to its physical form factor in a manner that affects its capabilities, including, for example, its radio performance.

These physical form factor changes, for example, may include:

A foldable device or display connected to the device is folded/unfolded so that, for instance, the amount of available antennas changes. This can affect, for example, multiple input multiple output (MIMO), advance receiver capabilities, supported frequency bands or interference cancellation capability.

A multi-form device is set to a different form which considerably alters the physical dimensions of the device in a way which considerably can alter its radio performance.

An extendable device which can be physically (or wirelessly) docked to another device, such as a tablet or car communication unit.

A stretchable/bendable device with a continuum of forms. If the antennas are rigid, the changing element is the physical separation of the antennas. Here, the device could signal the new form after it has not been changed for a certain period of time (threshold t1), and/or indicate that now the form is being changed if changing lasts longer than a threshold (t2).

According to some embodiments, some examples of indications sent from the device to the network may include:

Update on device MIMO capability based on changed form factor, including transmission or reception aspects or both, for UL and/or DL, respectively. The changes to reception capabilities include advanced receiver techniques for enhancing reception of multiple data streams in MIMO transmissions as well as for suppressing interference from transmissions intended for other users, for example using Minimum Mean Square Error (MMSE), Interference Rejection Combining (IRC), and Successive Interference Cancellation (SIC) receivers. Changes to the expected performance of the aforementioned receivers due to form factor changes may affect the network's ability to manage intra-cell and inter-cell interference within the network.

Update on expected radio performance based on different baseband processing capability based on changed form factor, including transmission or reception aspects or both, for UL and/or DL, respectively. Such changes in baseband processing capability may be due to variable battery supply available in different form factors as well as by adding processing capability, for example when a device is connected physically (or wirelessly) to another device.

Update on supported frequency bands and carrier aggregation capabilities (some wavelengths may be possible to support only when, e.g., some minimum antenna length/separation is physically available).

Update on supported radios (relevant e.g., REL-12 Study Item: WLAN/3GPP Radio Interworking), for example, some radios can be operational only with certain form factor.

One embodiment of the invention relates to the fact that that the change in physical form factor of a device often correlates very well with the way the device is used. For example, when a foldable display is closed, the device is most probably used mostly for talking or is idle. On the other hand, when the display is open, it is very likely that the device is used more actively, such as for internet browsing or gaming, and hence the data needs are much higher. It is also then natural that, for example, the highest MIMO capabilities are not needed in the closed form factor where the device is likely used for voice calls or is idle.

Figure 1:
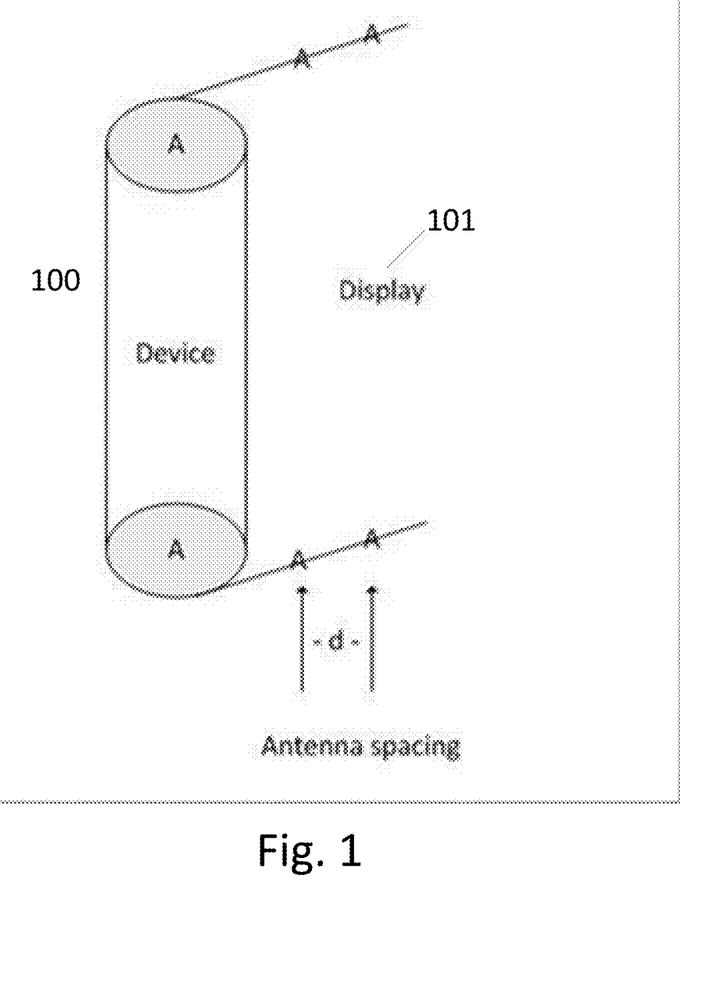
FIG. 1 illustrates an example of a device, according to one embodiment.

FIG. 1 illustrates an example of a flexible device, according to one embodiment. In this example, the device includes a foldable or rollable display. It should be noted, however, that embodiments are not limited to this type of device. Embodiments are also applicable to devices with other form factors including, but not limited to, flexible, expandable, and/or extendable devices.

As illustrated in the example of FIG. 1, a base device 100 (the "cylinder") has a folded, rollable display 101. The base device 100 can have set of antennas A. When the display 101 is unfolded, it reveals more antennas A, separated by a distance d. It is possible that the new antennas A revealed when the display 101 is unfolded become active only when the display 101 is unfolded.

According to an embodiment, the device 100 has a mechanism to tell when the form factor changes, such as when the display is open or unfolded. In some embodiments, there can even be different thresholds for how "open" the display is. This mechanism can then trigger specific indications to the network, such as a change in the MIMO capability, based on the change in form factor. The triggers can be configured by the device manufacturer and can include configuring which triggers correspond to which kind of signaling. According to certain embodiments, different kinds of hysteresis and thresholds can be applied to avoid unnecessary and frequent signaling and ping-pong effects.

Figure 2:
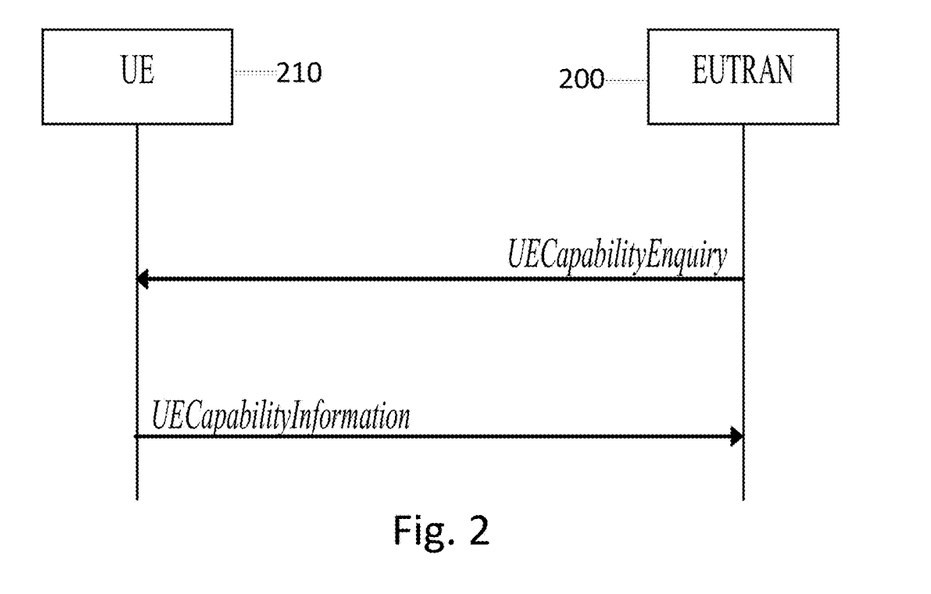
FIG. 2 illustrates an example of a signaling diagram, according to an embodiment.

In 3GPP LTE, configuration of UE capabilities can be done via UE-specific radio resource control (RRC) signaling, including for example the number of layers (MIMO-CapabilityDL-r10 {twoLayers, fourLayers, eightLayers} field in TS 36.331). FIG. 2 illustrates an example signaling diagram depicting UE capability transfer, for example, for E-UTRA (UE-EUTRA-Capability). A purpose of this procedure is to transfer UE radio access capability information from the UE to E-UTRAN. As illustrated in FIG. 2, the network (e.g., E-UTRAN) 200 sends a UECapabilityEnquiry message to the UE 210. In response, the UE 210 sends a UECapabilityInformation message to the network 200.

In order to support the change in UE capabilities dynamically, the UE 210 can update the configuration sent to the network once the form factor has changed in a way such that the parameters known by the network are no longer up-to-date. For example, referring to the example signaling diagram illustrated in FIG. 2, the UE 210 may send a UE Capability Information message to the network when its form factor has changed in a manner rendering the parameters known by the network as not up-to-date.

In order to minimize signaling overhead due to the potentially frequent changes in form factor that affect the UE capabilities, according to an embodiment, it is possible for the UE 210 to signal to the network 200 a set of pre-defined RRC configurations. Upon a change in form factor, the UE 210 can indicate to the network which of the pre-defined RRC configurations should be assumed by the network 200. For example, in the case of two configurations being supported, the UE 210 would require only 1-bit signaling to indicate a configuration change due to a form factor change. The signaling bit can also be piggybacked onto some existing signaling messages/bearers.

According to an embodiment, another mechanism for configuration of UE capabilities includes Feature Group Indicators (FGI), which include high-level configurations on basic UE features. Eventually, some of the changeable capabilities might imply a change in UE category, in which case it would have to also be updated following a relevant change in form factor.

In an alternative implementation, according to an embodiment, the UE would not just indicate one capability, but a set of capabilities or a range, for example during initial access to the network. The UE can then just signal to the network which capability or subset of capabilities it is currently using. In this case, signaling would only be needed when the capability changes.

It should be noted that embodiments of the invention are not limited to LTE and can be applied in any number of communications networks.

Figure 3:
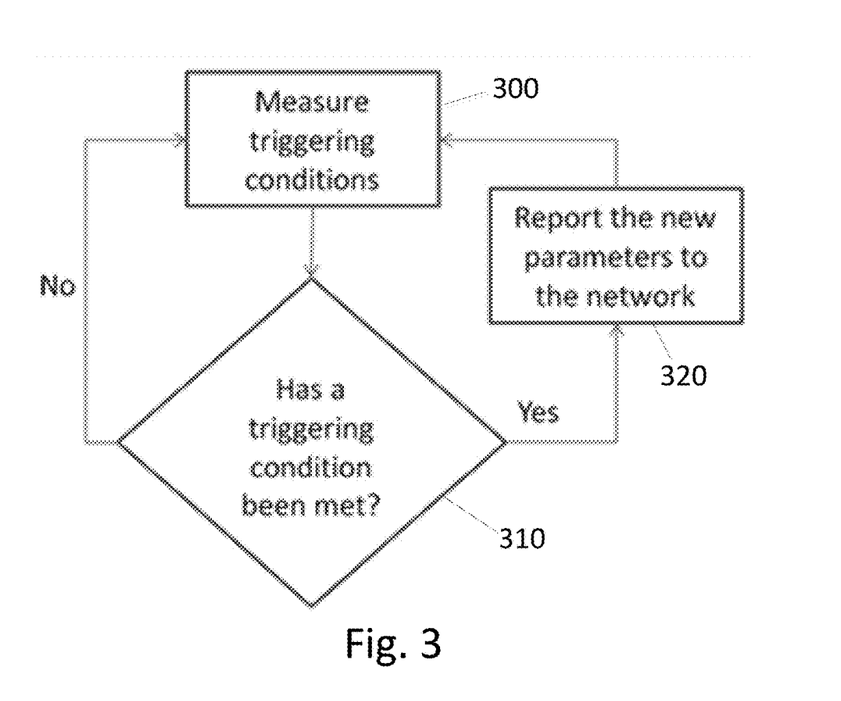
FIG. 3 illustrates an example of flow chart of a method, according to one embodiment.

FIG. 3 illustrates a flow chart of an example triggering procedure, according to one embodiment. In the example of FIG. 3, triggering conditions are measured at 300. The triggering conditions can include, for example, a change in a form factor of the device, such as the display being folded or unfolded, attached or detached, etc. At 310, it is determined whether a triggering condition has been met. If a triggering condition has been met, then, at 320, the new parameters are reported to the network. If a triggering condition has not been met, then the process returns to 300 where triggering conditions are again measured.

Figure 4A:
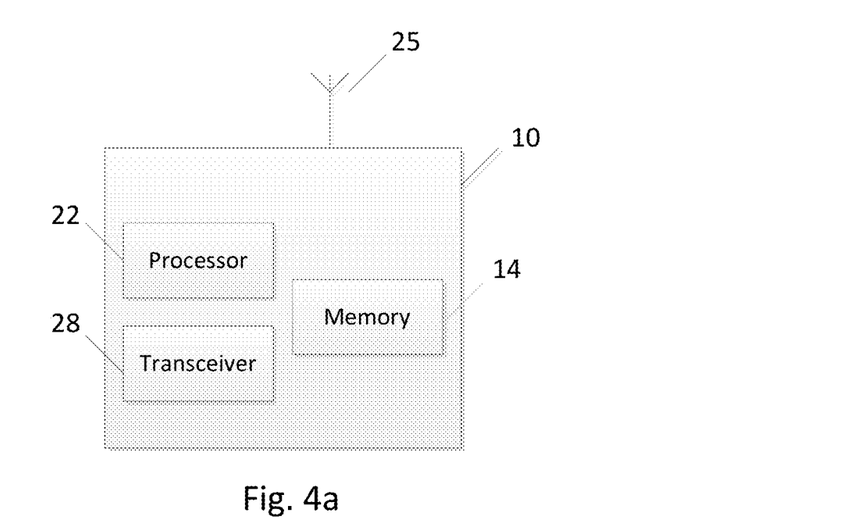
FIG. 4a illustrates a block diagram of an apparatus according to one embodiment.

FIG. 4a illustrates an example of an apparatus 10 according to an embodiment. In one embodiment, apparatus 10 may be a UE or mobile device with multiple and/or flexible form factor. For instance, apparatus 10 may be a device as illustrated in FIG. 1 discussed above. However, it should be understood that apparatus 10 can take other forms and the device illustrated in FIG. 1 is merely one example. Further, it should be noted that one of ordinary skill in the art would understand that apparatus 10 may include components or features not shown in FIG. 4a. Only those components or features necessary for illustration of the invention are depicted in FIG. 4a.

As illustrated in FIG. 4a, apparatus 10 includes a processor 22 for processing information and executing instructions or operations. Processor 22 may be any type of general or specific purpose processor. While a single processor 22 is shown in FIG. 4a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a UE or mobile device with multiple and/or flexible form factor. For example, according to certain embodiments, apparatus 10 may be a flexible, bendable, and/or stretchable device; apparatus 10 may also be a device from which some parts can be attached to or removed from (e.g., the device may be put on a holder in a car and utilizes the car's antenna/RF).

In an embodiment, apparatus 10 may be controlled by memory 14 and processor 22 to determine a current form or a change in the form of the apparatus 10, determine new parameters according to the determined current form of the apparatus 10, and report the new parameters to the network. According to one example, apparatus 10 may be controlled by memory 14 and processor 22 to determine the current form or the change in the form of the apparatus 10 by measuring at least one triggering condition. Apparatus 10 may be controlled to measure the at least one triggering condition by detecting a change in the form of the device, for example. In other words, in one embodiment, the at least one triggering condition may include a change in the form of the device. For instance, in the example shown in FIG. 1, the change in the form of the device may be the display being rolled or unrolled thereby increasing or decreasing the number of antennas. According to an embodiment, apparatus 10 may be controlled by memory 14 and processor 22 to determine whether the at least one triggering condition has been met and, when the triggering condition has been met, to report new parameters to the network.

In an embodiment, the new parameters may include an update on the device multiple input multiple output (MIMO) capability, an update on advanced receiver capability, an update on supported frequency bands and carrier aggregation capabilities, and/or an update on supported radios.

According to certain embodiments, apparatus 10 may be controlled by memory 14 and processor 22 to signal a set of pre-defined radio resource configurations (RRC) to the network, and to indicate to the network which of the pre-defined RRC configurations is used by the device. According to another embodiment, apparatus 10 may be controlled by memory 14 and processor 22 to report the new parameters by sending feature group indicators (FGIs) to the network.

In an embodiment, apparatus 10 may be controlled by memory 14 and processor 22 to signal a set of capabilities to the network during initial access to the network, and, when the triggering condition is met, to signal to the network which at least one of the set of capabilities is being used by the device. As an illustrative example, apparatus 10 may have support for capability sets A, B, and C, depending on the form factor of apparatus 10. When attaching to the network, apparatus 10 signals the starting set A, B or C to the network. When the form factor of apparatus 10 changes (i.e., trigger occurs) the new set of capabilities is signaled to the network. Accordingly, in this embodiment, the triggering (e.g., change in form of apparatus 10) can result in a change in the set of capabilities, which may be signaled to the network while the apparatus 10 is already attached thereto.

When the capability set is rather large, a substantial number of bits will be required for signaling, implying in large overhead if the capability change occurs often. According to the previous embodiment, the full set of parameters would need to be signaled when there is a change in the device capability. Certain embodiments, however, can avoid this increased signaling. According to one embodiment, during an initial phase (e.g., attach to the network), apparatus 10 may signal all the supported capability sets to the network, i.e., A, B and C, and specify which of the set is currently active. When the capability changes, apparatus 10 can just signal a pointer to the new set (e.g., 1 bit required for 2 sets, 2 bits for 4 sets etc.). According to another embodiment, apparatus 10 may signal only the changed part when the change is minimal. For example, if B is the same as A except the A.featureX part, apparatus 10 can signal only A.featureX. As a result, in this example, only the changed part of the capability is signaled.

According to another embodiment, apparatus 10 can initially separately signal to the network that apparatus 10 is capable of multiple capabilities. In other words, in this embodiment, the apparatus 10 can indicate to the network the ability to have several capability sets and/or the fact that some of the capability items can be changed dynamically. This can be useful information for the network.

In certain embodiments, the network may request capability information when there is any change to the capabilities of apparatus 10. This could be periodic or triggered by the network itself for whatever reason.

Figure 4B:
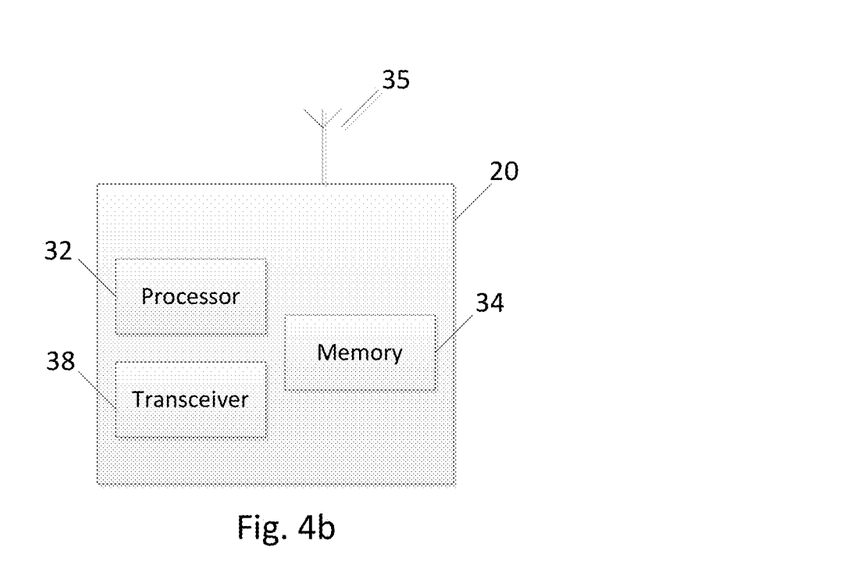
FIG. 4b illustrates a block diagram of an apparatus according to another embodiment.

FIG. 4b illustrates an example of an apparatus 20 according to another embodiment. In an embodiment, apparatus 20 may be a base station in a communications network, such as an eNB in LTE. It should be noted that one of ordinary skill in the art would understand that apparatus 20 may include components or features not shown in FIG. 4b. Only those components or features necessary for illustration of the invention are depicted in FIG. 4b.

As illustrated in FIG. 4b, apparatus 20 includes a processor 32 for processing information and executing instructions or operations. Processor 32 may be any type of general or specific purpose processor. While a single processor 32 is shown in FIG. 4b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a base station in a communications network, such as an eNB in LTE. In this embodiment, apparatus 20 may be controlled by memory 34 and processor 32 to receive new parameters from a device having multiple forms, and update radio configurations for the device having multiple forms, based on the new parameters.

As mentioned above, in one embodiment, the new parameters may include an update on the device multiple input multiple output (MIMO) capability, an update on advanced receiver capability, an update on supported frequency bands and carrier aggregation capabilities, and/or an update on supported radios.

According to an embodiment, apparatus 20 may be controlled by memory 34 and processor 32 to receive a set of pre-defined radio resource configurations (RRC) from the device, and receive an indication, from the device, which of the pre-defined RRC configurations are used by the device. In another embodiment, apparatus 20 may be controlled by memory 34 and processor 32 to receive feature group indicators (FGIs) from the device.

In one embodiment, apparatus 20 may be controlled by memory 34 and processor 32 to receive a set of capabilities from the device during initial access to the network element, and receive an indication of which of the set of capabilities is being used by the device.

Figure 5:
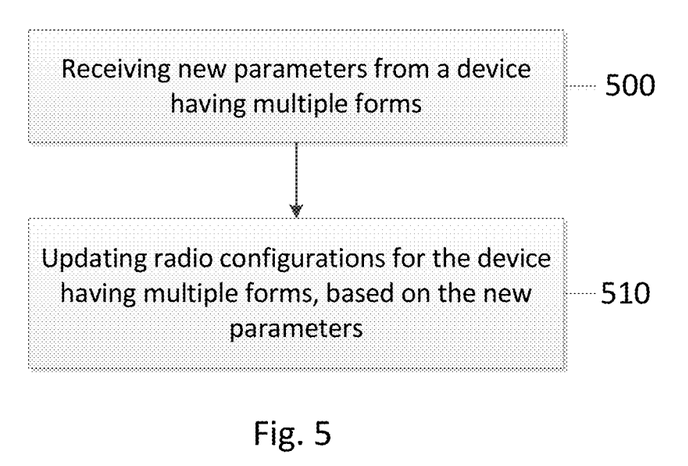
FIG. 5 illustrates an example of flow chart of a method, according to another embodiment.

FIG. 5 illustrates a flow chart of an example triggering procedure, according to one embodiment. In the example of FIG. 5, the method includes, at 500, receiving, by a network element, new parameters from a device having multiple forms. The method may further include, at 510, updating radio configurations for the device having multiple forms, based on the new parameters.

In some embodiments, the functionality of any of the methods described herein, such as those illustrated in FIGS. 3 and 5 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Embodiments of the invention can provide several advantages. For example, some advantages include better user experience in terms of throughput and delay, as well as higher capacity and spectral efficiency for the network which is able to better optimize its operation for the devices which have multiple/flexible form factors. Another advantage includes better connectivity since new type of signaling could allow new frequency bands to be used. In addition, certain embodiments can result in better performance and/or improved battery life-time for the UE since the network can better optimize the radio configurations for the device.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
signaling, by a device associated with a network and capable of having multiple form factors that affect radio operation, all sets of pre-defined radio resource control (RRC) configurations supported by the device to the network, wherein each set of the sets of pre-defined RRC configurations depends on a supported form factor of the device, and wherein the dependency corresponds to the sets of pre-defined RRC configurations that only match form factors supported by the device;
specifying at a first time by the device, which one of the sets of pre-defined RRC configurations is active;
determining, by the device, a change in the form factor of the device;
determining which set of the sets of pre-defined RRC configurations is to be used by the device according to the change in the form factor of the device; and
signaling after the first time, upon the change in the form factor of the device, a pointer to the network, to indicate the determined set of the sets of pre-defined RRC configurations supported by the device which is currently active, wherein when two sets of pre-defined RRC configurations are supported, only 1-bit signaling is required to indicate a change to one of the two sets of pre-defined RRC configurations due to the change in the form factor of the device.

2. The method according to claim 1, wherein the determining of the current form factor of the device comprises measuring at least one condition, wherein the condition comprises whether there is a change in the current form factor of the device, and wherein the method further comprises reporting new radio communication parameters to the network when there is a change in the current form factor of the device.

3. The method according to claim 2, wherein the new radio communication parameters comprise at least one of an update on the device multiple input multiple output (MIMO) capability, an update on advanced receiver capability, an update to baseband processing impacting radio performance, an update on both supported frequency bands and carrier aggregation capabilities, an update on the device class, bandwidth and transmission power capability, and/or an update on supported radio technologies.

4. The method according to claim 2, wherein the measuring is initiated by a signaling from the network or a detected change in the current form factor of the device.

5. The method according to claim 1, wherein the form factors comprise a flexible form factor, a foldable form factor, an expandable form factor, an extendable form factor, or a stretchable form factor.

6. The method according to claim 1, wherein the method is performed by a user equipment operating under a cellular system.

7. The method according to claim 1, further comprising signaling the sets of pre-defined RRC configurations to the network during an initial access to the network in a first access to a session.

8. The method according to claim 1, further comprising, indicating, upon the change in the form factor of the device, to the network that a previous set of RRC configurations used by the network is not up-to-date.

9. An apparatus, comprising:
at least one processor; and
at least one memory comprising computer program code,
wherein the apparatus is capable of having multiple form factors that affect radio communication and associated with a network, and
wherein the at least one memory and the computer program code are configured, with the at least one processor, to cause the apparatus at least to signal all sets of pre-defined radio resource configurations (RRC) configurations supported by the apparatus to the network,
wherein each set of the sets of pre-defined RRC configurations depends on a supported form factor of the apparatus, and
wherein the dependency corresponds to the sets of pre-defined RRC configurations that only match form factors supported by the apparatus;
specify at a first time, which one of the sets of pre-defined RRC configurations is active;
determine a change in the form factor of the apparatus;
determine which set of the sets of pre-defined RRC configurations is to be used by the apparatus according to the change in the form factor of the apparatus; and
signal after the first time, upon the change in the form factor of the apparatus, a pointer to the network, to indicate the determined set of the sets of pre-defined RRC configurations supported by the apparatus which is currently active,
wherein when two sets of pre-defined RRC configurations are supported, only 1-bit signaling is required to indicate a change to one of the two sets of pre-defined RRC configurations due to the change in the form factor of the apparatus.

10. The apparatus according to claim 9, wherein the at least one memory and the computer program code are further configured, with the at least one processor, to cause the apparatus at least to
determine the current form factor of the apparatus by measuring at least one condition,
wherein the condition comprises a change in the current form factor of the apparatus, and
report new radio communication parameters to the network when there is a change in the current form factor of the apparatus.

11. The apparatus according to claim 10, wherein the new radio communication parameters comprise at least one of
an update on the apparatus multiple input multiple output (MIMO) capability,
an update on advanced receiver capability,
an update to baseband processing impacting radio performance,
an update on both supported frequency bands and carrier aggregation capabilities,
an update on the apparatus class, bandwidth and transmission power capability, and/or
an update on supported radio technologies.

12. The apparatus according to claim 10, wherein the at least one memory and the computer program code are further configured, with the at least one processor, to cause the apparatus at least to report the new radio communication parameters by sending feature group indicators (FGIs) to the network.

13. The apparatus according to claim 10, wherein the at least one memory and the computer program code are further configured, with the at least one processor, to cause the apparatus at least to initiate the measuring by a signaling from the network or a detected change in the current form factor of the apparatus.

14. The apparatus according to claim 9, wherein the apparatus comprises physically separate parts.

15. The apparatus according to claim 9, wherein the apparatus is a user equipment operating under a cellular system.

16. The apparatus according to claim 9, wherein the at least one memory and the computer program code are further configured, with the at least one processor, to cause the apparatus at least to signal the sets of pre-defined RRC configurations to the network during an initial access to the network in a first access to a session.

17. The apparatus according to claim 9, wherein the at least one memory and the computer program code are further configured, with the at least one processor, to cause the apparatus at least to indicate, upon the change in the form factor of the device, to the network that a previous set of RRC configurations used by the network is not up-to-date.

18. A computer program, embodied on a non-transitory computer readable medium, wherein the computer program is configured to control a processor to perform a process, comprising:
signaling, by a device associated with a network and capable of having multiple form factors that affect radio operations, all sets of pre-defined radio resource control (RRC) configurations supported by the device to the network, wherein each set of the sets of pre-defined RRC configurations depends on a supported form factor of the device, and wherein the dependency corresponds to the sets of pre-defined RRC configurations that only match form factors supported by the device;

specifying at a first time, which one of the sets of pre-defined RRC configurations is active;

determining, by the device, a change in the form factor of the device;

determining which set of the sets of pre-defined RRC configurations is to be used by the device according to the change in the form factor of the device; and signaling after the first time, upon the change in the form factor of the device, a pointer to the network, to indicate the determined set of the sets of pre-defined RRC configurations supported by the device which is currently active, wherein when two sets of pre-defined RRC configurations are supported, only 1-bit signaling is required to indicate a change to one of the two sets of pre-defined RRC configurations due to the change in the form factor of the device.

* * * * *